US009378612B2

(12) United States Patent
Ansari et al.

(10) Patent No.: US 9,378,612 B2
(45) Date of Patent: Jun. 28, 2016

(54) MORPHING GEOMETRIC STRUCTURES OF WAGERING GAME OBJECTS

(75) Inventors: Marwan Y. Ansari, Plainfield, IL (US); Michael J. Irby, II, Chicago, IL (US); Mark T. Sieka, Frankfort, IL (US); Craig J. Sylla, Round Lake, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 1307 days.

(21) Appl. No.: 12/987,065

(22) Filed: Jan. 7, 2011

(65) Prior Publication Data

US 2011/0183739 A1 Jul. 28, 2011

Related U.S. Application Data

(60) Provisional application No. 61/293,448, filed on Jan. 8, 2010.

(51) Int. Cl.
*A63F 13/00* (2014.01)
*G07F 17/32* (2006.01)

(52) U.S. Cl.
CPC ............ *G07F 17/3223* (2013.01); *G07F 17/32* (2013.01); *G07F 17/323* (2013.01); *G07F 17/3232* (2013.01)

(58) Field of Classification Search
USPC ...................................................... 463/16-20
See application file for complete search history.

(56) References Cited

U.S. PATENT DOCUMENTS

| | | | | |
|---|---|---|---|---|
| 6,030,289 | A * | 2/2000 | Nomi et al. | 463/32 |
| 6,517,433 | B2 * | 2/2003 | Loose et al. | 463/20 |
| 6,577,305 | B1 | 6/2003 | Duluk et al. | |
| 6,897,869 | B1 * | 5/2005 | Bednar et al. | 345/441 |
| 6,954,211 | B2 | 10/2005 | Michail et al. | |
| 6,982,710 | B2 * | 1/2006 | Salomie | 345/420 |
| 7,218,322 | B2 | 5/2007 | Hoppe et al. | |
| 7,262,769 | B2 | 8/2007 | Hoppe et al. | |
| 7,425,954 | B2 | 9/2008 | Hoppe et al. | |
| 7,567,258 | B2 | 7/2009 | Michail et al. | |
| 7,573,474 | B2 | 8/2009 | Hoppe et al. | |
| 7,864,179 | B1 | 1/2011 | Acquavella | |

(Continued)

FOREIGN PATENT DOCUMENTS

| | | |
|---|---|---|
| JP | 08-155104 | 6/1996 |
| JP | 2000-312749 | 11/2000 |

(Continued)

*Primary Examiner* — David L Lewis
*Assistant Examiner* — Eric M Thomas
(74) *Attorney, Agent, or Firm* — DeLizio Law, PLLC

(57) ABSTRACT

A wagering game system and its operations are described herein. In embodiments, the operations can include accessing a wagering game object in a wagering game application running on a wagering game machine, where the wagering game object can include a plurality of degenerate polygons that form a first geometric structure for the wagering game object. The operations can further include determining a second geometric structure that is structurally distinct from the first geometric structure, and morphing the wagering game object from the first geometric structure into the second geometric structure via manipulation of the plurality of degenerate polygons. The operations can further include determining conditions that dictate the shape of the second geometric structure and morphing the wagering game object using a morphing algorithm associated with the conditions. Further, the operations can include providing outcomes and awards in accordance with the second geometric structure.

28 Claims, 8 Drawing Sheets

(56) References Cited

U.S. PATENT DOCUMENTS

| | | | | |
|---|---|---|---|---|
| 2002/0005854 | A1 | 1/2002 | Deering et al. | |
| 2003/0045343 | A1* | 3/2003 | Luccesi et al. | 463/20 |
| 2003/0069063 | A1* | 4/2003 | Bilyeu et al. | 463/20 |
| 2004/0077404 | A1* | 4/2004 | Schlottmann et al. | 463/30 |
| 2004/0102245 | A1* | 5/2004 | Escalera et al. | 463/32 |
| 2006/0128467 | A1* | 6/2006 | Thomas | 463/31 |
| 2006/0189377 | A1* | 8/2006 | Gomez et al. | 463/20 |
| 2007/0103465 | A1 | 5/2007 | Barenbrug et al. | |
| 2008/0094412 | A1 | 4/2008 | Jiao et al. | |
| 2008/0141131 | A1 | 6/2008 | Cerny et al. | |
| 2009/0073166 | A1 | 3/2009 | Dorbie | |
| 2009/0309876 | A1 | 12/2009 | Dorbie | |

FOREIGN PATENT DOCUMENTS

| | | |
|---|---|---|
| JP | 2001-276360 | 10/2001 |
| JP | 2003-52952 | 2/2003 |
| WO | WO-2009058845 | 5/2009 |

* cited by examiner

MORPHING GEOMETRIC STRUCTURES OF WAGERING GAME OBJECTS

RELATED APPLICATIONS

This application claims the priority benefit of U.S. Provisional Application Ser. No. 61/293,448 filed Jan. 8, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

TECHNICAL FIELD

Embodiments of the inventive subject matter relate generally to wagering game systems and networks that, more particularly, morph geometric structures of wagering game objects.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Wagering game programmers are also interested in programming games that can make wagering games applications easier to program, easier to run, and less taxing on wagering game machine resources. For example, many programmers program wagering games relying on a “morph targeting” method for changing shapes of three-dimensional (3D) objects that are presented on the wagering games. Morph targeting uses target shapes that describe a beginning and end position of a 3D object (e.g., an open and closed position of a character’s mouth or eyelid). Morph targeting includes indicating a morph degree, delta, or difference (e.g., between 0 amount of morph to 100% of morph) with predefined beginning and end positions that cannot vary from those degrees, but that only change shape within the range of morph difference. Rendering hardware on a wagering game machine, which modifies 3D objects using morph targeting, has to store a set of pre-defined 3D models of the 3D object. A 3D model is a mathematical, wireframe representation of the 3D object. Morph targeting utilizes the sets of pre-defined 3D models to apply shape modifications from the beginning point of the morph degree to the end point of the morph degree (for a non-fluid transition) and every stage of shape modification between beginning point to end point (for a fluid transition). Morph targeting uses the pre-defined 3D models at each of the stages of shape change for the 3D object. However, processing the multiple pre-defined 3D models via morph targeting can tax hardware resources, require extra storage space, and waste energy.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

As stated previously, wagering game companies are interested in creating and providing innovate wagering games and gaming features to the demanding public. Further, wagering game programmers are interested in creating wagering games that are efficient, that do not waster energy and resources, etc. Embodiments of the invention describe using degenerate polygons to morph three-dimensional (3D) geometric structures of 3D wagering-game graphical objects (“3D objects”) that are utilized to play, control, or present a wagering game. A degenerate polygon is a structural unit of a 3D model, or a piece of 3D geometry for a 3D object, that is configured to have movable vertices. Using degenerate polygons to morph 3D objects may be referred to herein as “degenerate polygon morphing.” According to some embodiments, degenerate polygon morphing can attain a 3D object’s target geometric structure by moving vertices of degenerate polygons associated with the 3D object. In some embodiments, degenerate polygon morphing can manipulate shapes of 3D objects in a wagering game application without having to store and use multiple pre-defined 3D models to generate a range of shapes. In addition, according to some embodiments, degenerate polygon morphing can use graphical object morphing algorithms ("object morphing algorithms") to control the degenerate polygons and morph the 3D object's shape. Object morphing algorithms can be stored on a wagering game machine or elsewhere on a wagering game network, and can receive parameters associated with a variety of conditions (e.g., player conditions, game conditions, network conditions, etc.). The algorithms can use the parameters to control the morphing of the 3D objects.

Figure 1:
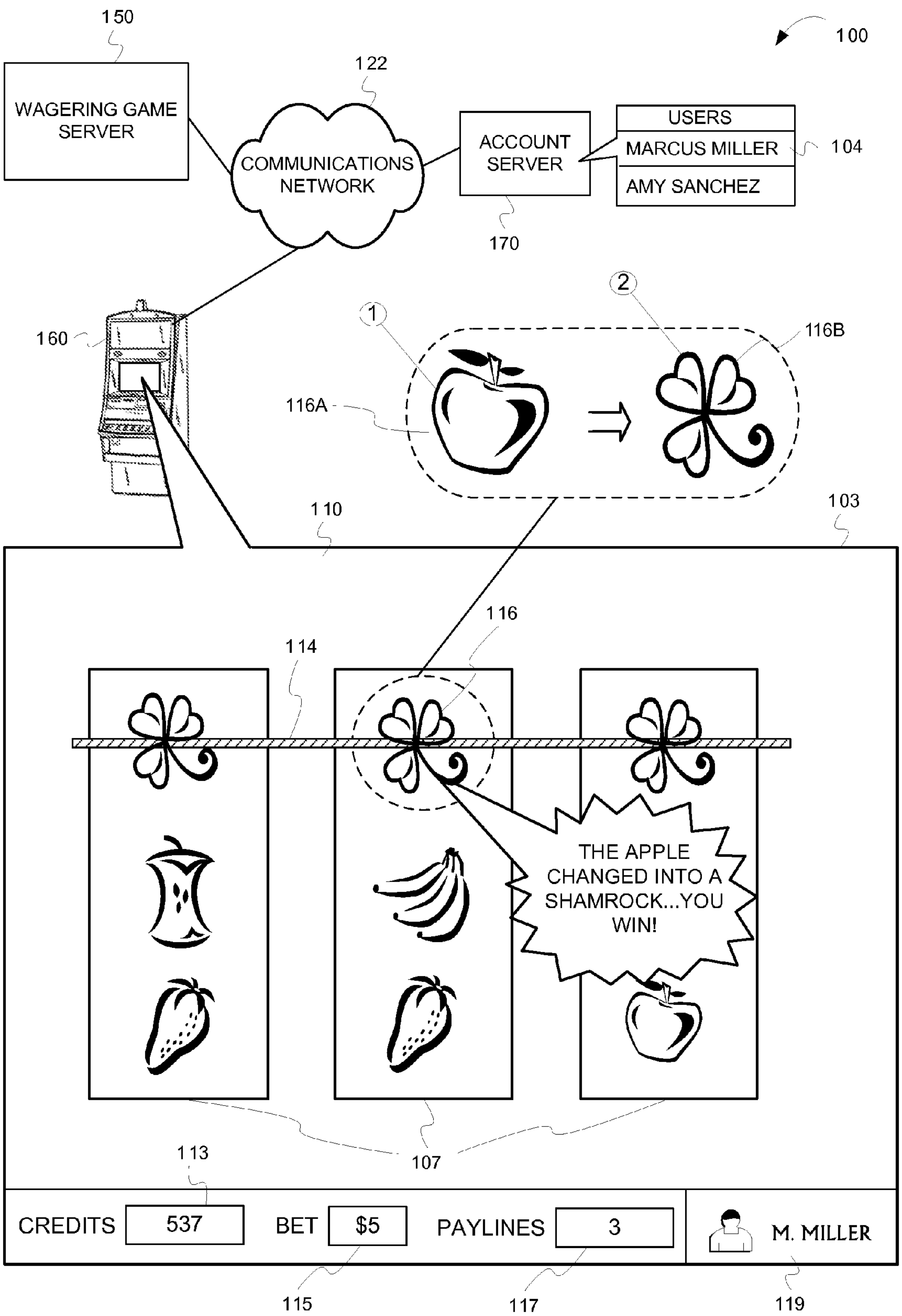
FIG. 1 is an illustration of morphing a geometric structure of a playing object in a wagering game via degenerate polygon morphing, according to some embodiments.

FIG. 1 is a conceptual diagram that illustrates an example of morphing a geometric structure of a playing object in a wagering game via degenerate polygon morphing, according to some embodiments. In FIG. 1, a wagering game system ("system") 100 includes a wagering game machine 160 connected to a wagering game server 150 via a communications network 122. Also included in the system 100 is an account server 170, which is also connected to the communications network 122. The account server 170 host can host a wagering game account (e.g., player account 104 for the user "Marcus Miller"). The user (i.e., Marcus Miller) can log in to the player account 104 via the wagering game machine 160 (e.g., via a graphical user interface, via a player card swipe, etc.) to initiate a wagering game session. A wagering game machine display ("display") 103 can present a wagering game application ("wagering game") 110 that the user can play during the wagering game session. The wagering game 110 can include includes slot reels ("reels") 107, a credit meter 113, a bet meter 115, a payline meter 117, and player account login information 119. The reels 107 can include wagering game elements, such as a slot reel object 116.

In some embodiments, the system 100 can select a wagering game object from the wagering game, such as the slot reel object 116. The wagering game object (e.g., the slot reel object 116) can be configured with a plurality of degenerate polygons to form its three-dimensional (3D) geometric structure.

The system 100 can use the degenerate polygons, such as degenerate triangles, to display a first or initial 3D geometric structure ("initial geometric structure") 116A (e.g., an apple shape) for the slot reel object 116. The system 100 can also use the degenerate polygons to morph the slot reel object 116 into a different 3D shape with an entirely different 3D geometric structure, such as a second, or "target" 3D geometric structure ("target geometric structure") 116B (e.g., a shamrock shape). The system 100 can manipulate movable vertices of the degenerate polygons to morph the slot reel object 116 from the initial geometric structure 116A to the target geometric structure 116B.

In some embodiments, the system 100 can select object morphing algorithms stored on the wagering game machine 160, the wagering game server 150, and other any other device accessible via the communications network 112. The object morphing algorithms can instruct the wagering game machine 160 to move the vertices of the degenerate polygons that make up the slot reel object 116. The system 100 can store and periodically transfer the algorithms across the communications network 122. Furthermore, in some embodiments, the system 100 can select a specific object morphing algorithm based on conditions that occur, or that are manifest, during the wagering game session. The conditions can relate to the user, the player account 104, the wagering game machine 160, the wagering game server 150, the account server 140, the wagering game 110, or any other device, entity, user, event, activity, state, etc. that the system 100 can access, detect, track, etc. The system 100 can determine the condition associated with the wagering game session and select a specific object morphing algorithm that is related to, or associated with, the condition. The system 100 can use the specific object morphing algorithm to morph the geometric structure of the wagering game object (e.g., the slot reel object 116) from the initial geometric structure 116A to the target geometric structure 116B using the degenerate polygons. The system 100 can render the slot reel object 116 on the display 103 at a first stage "1," while the slot reel object 116 is still in its initial geometric structure 116A. The system 100 can later render the slot reel object 116 on the display 103 and at a second stage "2," after the slot reel object 116 has morphed into the target geometric structure 116B. The system 100 can also render the morphing of the slot reel object 116 in multiple successive stages, creating a smooth transition between the initial geometric structure 116A and the target geometric structure 116B.

Furthermore, the system 100 can generate a wagering game result in accordance with the morphed, target geometric structure 116B. For example, because the slot reel object 116 morphed from an apple shape to a shamrock shape, the wagering game 110 may generate a win result according to game rules and a pay table (e.g., a pay table pays out a specific amount, based on a wager value, for three shamrocks that occur along a payline). In some embodiments, the system 100 can randomly select a game outcome and then morph the slot reel object 116 to a shape that displays the outcome. In some embodiments, the system 100 may randomly regenerate outcomes or may provide new, or bonus, rewards. In such instances, the system 100 may morph objects to indicate the regenerated results or the new rewards, such as morphing the apple shape to the shamrock shape to indicate the regenerated game outcome. In other embodiments, however, the system 100 may morph objects to reveal a game outcome after first presenting a "wild" or "place holder" slot reel object shape that eventually morphs into the intended shape. For example, the system 100 can generate a game outcome that intends for the slot reel object 116 to eventually be a shamrock shape. However, the system 100 may first present the apple shape with the initial geometric structure 116A as a place holder shape, so that it can create anticipation in the game player as the game player waits to see if the place holder shape morphs into a winning shape. In some embodiments, the wagering game 110 may advertise that any of its reel objects may morph, giving the impression of receiving a second chance to win. After presenting the place holder shape, the system 100 can morph the apple shape to the shamrock shape having the target geometric structure 116B. Thus, the system 100 can morph the apple shape to convey a sense that the game results may vary randomly and that losses may instantly change into wins via randomly morphing objects. The system 100 may have ultimately intended the apple to be a shamrock, but it may have delayed the presentation of the win result by first presenting a non-win outcome then subsequently presenting the win outcome. The wagering game 100 can present a payline graphic 114 that displays the winning outcome, and can award a prize to the player account 104 base on the winning outcome. In some embodiments, the system 100 can generate primary wagering game results, secondary game results, bonus game results, tournament game results, competitive or collaborative game results, or any other type of wagering game results. Further, the system 100 can provide non-monetary rewards to the player account 104 based on the target geometric structure 116B, such as player loyalty points, player status points, perks, merchandise, discounts, player trophies, additional games, new episodes of a previous game, tournament invitations, access to unreleased games, virtual items, website access, social network abilities, etc.

Further, some embodiments of the inventive subject matter describe examples of morphing geometric structures of wagering game objects in a network wagering venue (e.g., an online casino, a wagering game website, a wagering network, etc. using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
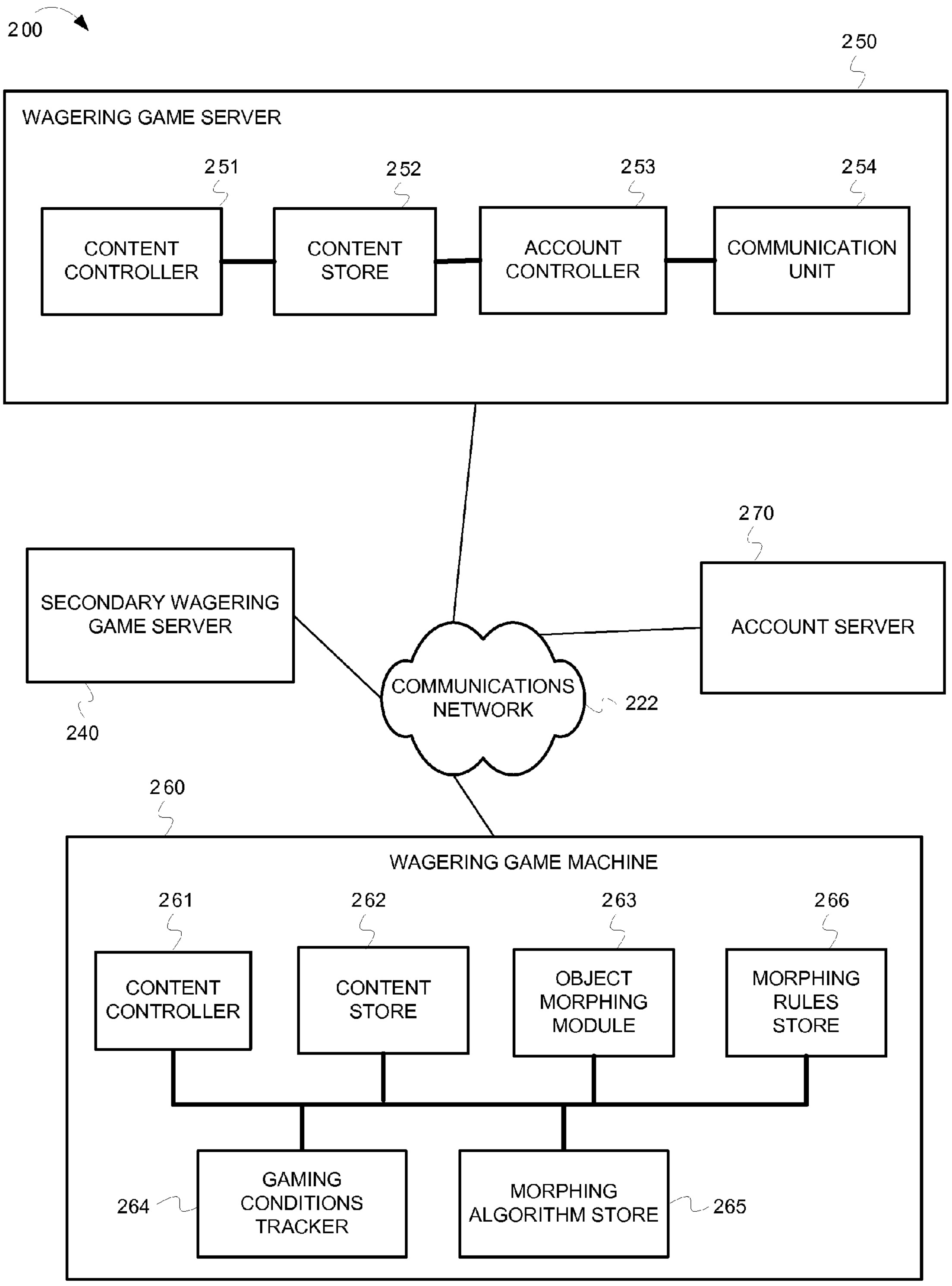
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to group games, settings related to social contacts, etc.), preferences (e.g., player preferences regarding object morphing, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks.

The wagering game system architecture 200 can also include the wagering game machine 260 configured to present wagering games and receive and transmit information to morph geometric structures of wagering game objects. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include a gaming conditions tracker 264 configured to track conditions that occur or that are manifest during a wagering game session. The wagering game machine 260 can also include a morphing algorithm store 265 configured to store object morphing algorithms that morph wagering game objects configured with degenerate polygons. The wagering game machine 260 can also include a morphing rules store 266 configured to store rules that govern morphing. The rules can correlate wagering game conditions with morphing actions. The wagering game machine 260 can also include an object morphing module 263 configured to control morphing of wagering game objects configured with degenerate polygons. In some embodiments, the object morphing module 263 is configured to determine conditions that correlate with morphing actions in accordance with morphing rules. The object morphing module 263 can further select a morphing algorithm that performs the morphing actions. The object morphing module 263 can further use the morphing algorithm to manipulate degenerate polygons on a wagering game object to morph the wagering game object into a new shape that is different in geometric structure from its previous shape. The object morphing module 263 can also communicate morphing information to the content controller 261, and to other devices (e.g., the wagering game server 250, the second wagering game server 240, the account server 270, etc.) to perform additional actions based on the new shape.

The wagering game system architecture 200 can also include a secondary game server 280 configured to provide content and control information for secondary games and other secondary content available on a wagering game network (e.g., secondary wagering game content, promotions content, advertising content, player tracking content, web content, etc.). The secondary game server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

Each component shown in the wagering game system architecture 200 is shown as a separate and distinct element connected via a communications network 222. However, some functions performed by one component could be performed by other components. For example, the wagering game server 250 can also be configured to perform functions of the gaming conditions tracker 264, the morphing algorithm store 265, the morphing rules store 266, the object morphing module 263, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
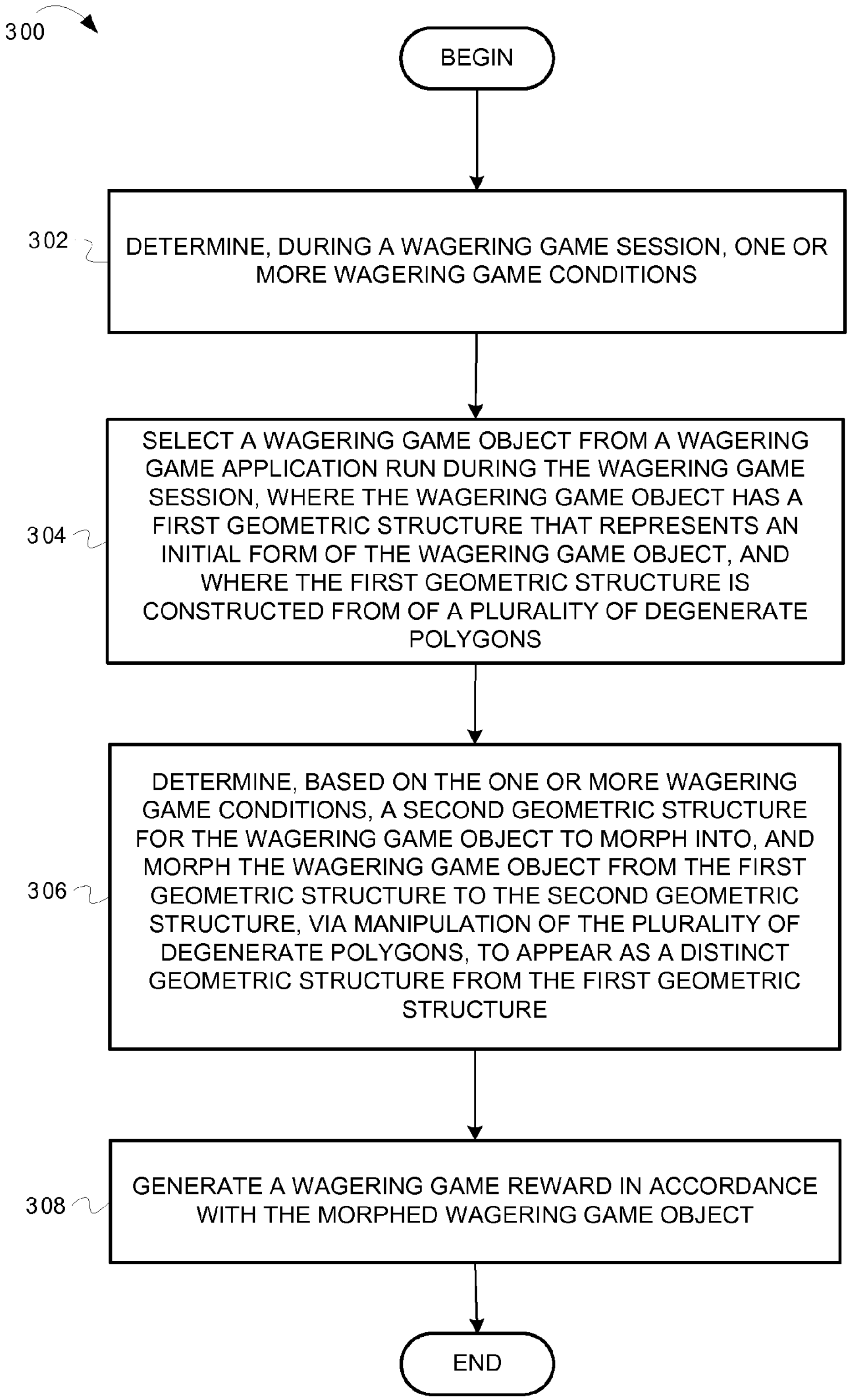
FIG. 3 is a flow diagram 300 illustrating morphing a wagering game object using degenerate polygons, according to some embodiments.
Figure 4:
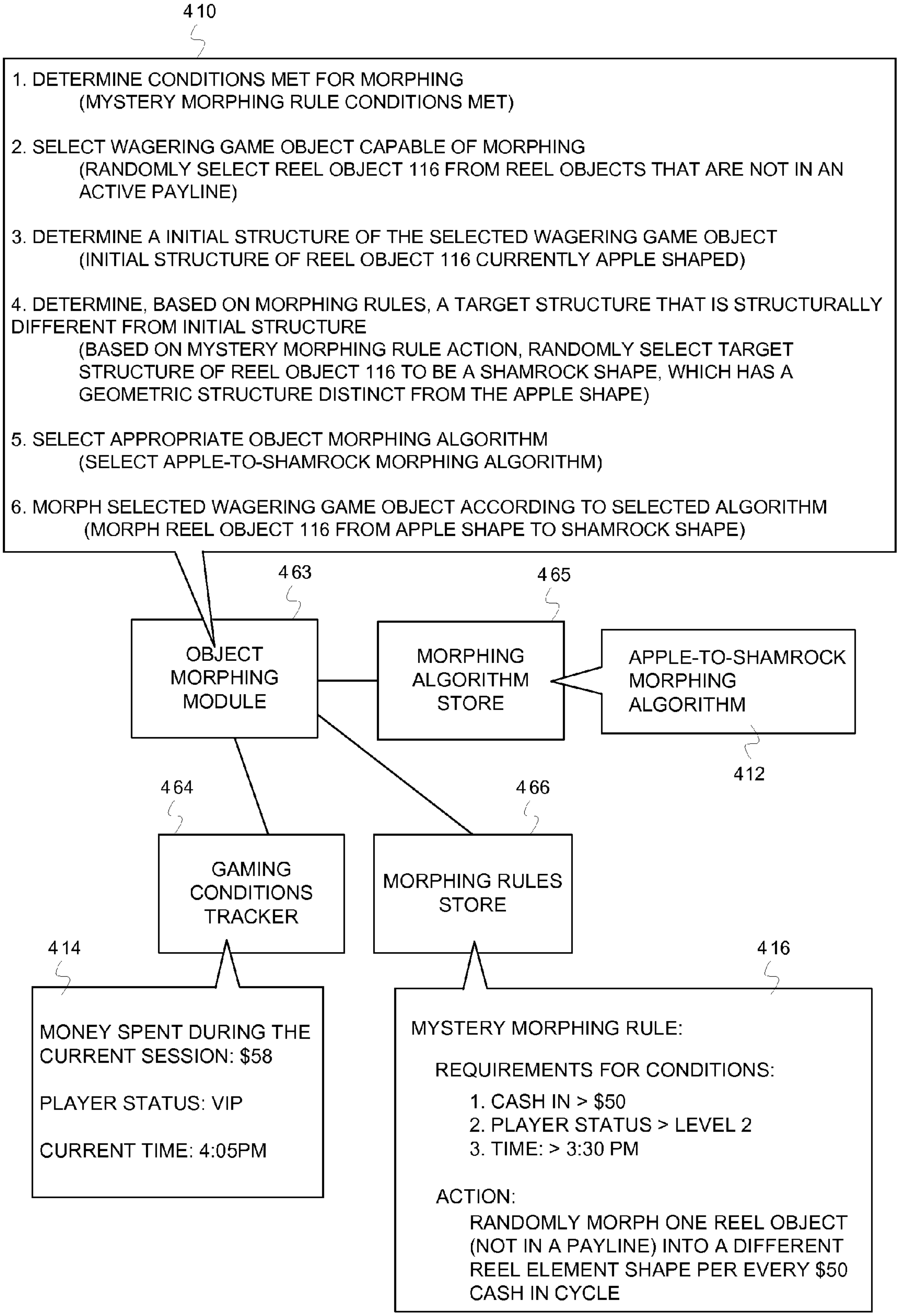
FIG. 4 is an illustration of morphing a wagering game playing element according to a morphing algorithm, according to some embodiments.

FIG. 3 is a flow diagram ("flow") 300 illustrating morphing a wagering game object using degenerate polygons, according to some embodiments. FIGS. 4 and 5 are conceptual diagrams that help illustrate the flow of FIG. 3, according to some embodiments. This description will present FIG. 3 in concert with FIGS. 4 and 5. In FIG. 3, the flow 300 begins at processing block 302, where a wagering game system ("system") determines, during a wagering game session, one or more wagering game conditions. In some embodiments, the one or more wagering game conditions can be gaming events, activities, settings, etc., that occur on, or are trackable by, the system. Some examples of wagering game conditions may include, but are not limited to, the following: a location of a player, a location of a wagering game machine, game events that occur during the wagering game session, a player's status, a time of day, a promotional setting, a player's game history, an amount of money put into a wagering game machine, a number of wagers performed on a wagering game machine, a progressive wagering game bonus, etc.

FIG. 4 illustrates an example of an object morphing module 463 that performs many of the operations described in the flow 300. For example, in FIG. 4, the object morphing module 463 performs operations indicated in the operation set 410. First, the object morphing module 463 can determine conditions associated with (e.g., as requirements for) one or more morphing rules. For instance, the object morphing module 463 can determine that all prerequisites have been met that are associated with a mystery morphing rule 416 from a morphing rules store 466. The object morphing module 463 can receive conditions information 414 from a gaming conditions tracker 464 and compare the conditions information 414 to a listing of requirements indicated in the mystery morphing rule 416. The mystery morphing rule 416 can also include an action that the object morphing module 463 can perform when the requirements have been met, such as mysteriously, or randomly, morphing a wagering game playing element for a wagering game application from one geometric state to another. As an example, requirements for the mystery morphing rule 416 include determining that a player has spent at least $50 during a wagering game session, that a player has a player status above a certain level (i.e., above level "2"), and that the a network time is after a specific time of day (i.e., after 3:30 PM). The object morphing module 463 can compare the conditions information 414 tracked by the gaming conditions tracker 464 and determine that a player playing a wagering game (e.g., the wagering game 110 in FIG. 1) has spent $58 (i.e., over $50), has a player status of VIP (i.e., >level 2), and that the current time is 4:05 PM (i.e., >3:30 PM). The object morphing module 463 thus determines that all of the requirements for the mystery morphing rule 416 have been satisfied.

The flow 300 continues at processing block 304, where the system selects a wagering game object from a wagering game application run during the wagering game session, where the wagering game object has a first geometric structure that represents an initial form of the wagering game object, and where the first geometric structure includes of a plurality of degenerate polygons. As stated previously, a degenerate polygon is a structural unit of a 3D model or piece of 3D geometry for a graphical object that is configured to have movable vertices. In a non-expanded state, a degenerate polygon can have two or more vertices that overlap exactly. An example of a degenerate polygon is a degenerate triangle. In some embodiments, a degenerate triangle may have all three vertices overlapping onto a single point. In other embodiments, a degenerate triangle may have two vertices overlapping and a third vertex forming a line segment with the two overlapping vertices. In another embodiment, a degenerate triangle may have three collinear points (i.e., a line segment where all three vertices are on the line, but do not overlap exactly, though any of the vertices may partially overlap along the line segment). When a degenerate polygon expands, then some, or all, of its overlapping vertices move and become non-overlapping, creating geometric space and structure on which to generate visible three-dimensional effects and characteristics. A wagering game object, according to some embodiments, can include multiple non-degenerate polygons and multiple degenerate polygons. The wagering game objects can be configured to have enough degenerate polygons to ensure that the wagering game object can be morphed into any three-dimensional shape or structure. In some embodiments, the wagering game object can consist of many degenerate polygons whose vertices overlap with, or are aligned along a line segment of, non-degenerate polygons.

In some embodiments, the system can access the wagering game application that includes the wagering game object and determine the current state of the wagering game object, such as a current, or initial geometric structure of the wagering game object. The initial geometric structure, or first geometric structure, includes the plurality of degenerate polygons to form its geometric shape. The geometric shape, or structure, is the virtual structure of the wagering game object as presented on a graphical mesh or wireframe. The degenerate polygons are, for example, degenerate triangles.

In one example, the system can determine activation of the wagering game application during the wagering game session by a wagering game account. Once the wagering game application is activated, the system can assign a plurality of degenerate triangles to a wagering game object for the wagering game application. The plurality of degenerate triangles is configured to constitute the geometric structure of the wagering game object. The system can construct the wagering game object as the initial geometric structure using the degenerate triangles.

In some embodiments, the wagering game object may be tagged, or otherwise indicated, as being a specific type of wagering game object that can morph its shape. The wagering game object can include properties or metadata that specify the first geometric structure. In some embodiments, the system may refer to a configuration file, a database, or any other location on a wagering game machine, or on a network device (e.g., a server), that stores information related to the initial geometric structure of the wagering game object. In some embodiments, the properties or metadata may specify the vertex attributes (vertex position, texture coordinates, normals, tangent, binormals, or material information) of the wagering game object that were used to construct, and position, the wagering game object as the initial geometric shape in its current position on a wagering game display.

In some embodiments, the system can select the wagering game object from one of multiple possible wagering game playing elements. For example, the system can select a wagering game playing element from a set of displayed wagering game playing elements for the wagering game. In some embodiments, the wagering game playing element can be a wagering game playing element that is not part of a winning result display for the wagering game (e.g., select a slot reel element that is not displaying a winning result, select a card that is not part of a winning hand, etc.). In other words, the system can determine that the wagering game playing element is in a subset of wagering game playing elements, from the set of displayed playing elements, that does not display the winning result for the wagering game. The wagering game playing elements can be constructed from degenerate polygons. In some embodiments, the system can select a wagering game playing element according to morphing rules associated with the wagering game condition. For example, in FIG. 4, the object morphing module 463 selects a wagering game object based on actions indicated in the mystery morphing rule 416. The mystery morphing rule 416 indicates that when requirements are met, the object morphing module 463 should select a reel object, not already in a payline, to morph into one of any other reel object shape associated with the wagering game application. Consequently, the object morphing module 463 may randomly select the slot reel object 116 when in its initial apple shape (i.e., initial geometric structure 116A).

The flow 300 continues at processing block 306, where the system determines, based on the one or more wagering game conditions, a second geometric structure for the wagering game object to morph into, and morph the wagering game object from the first geometric structure to the second geometric structure, via manipulation of the plurality of degenerate polygons, to appear as a distinct geometric structure from the first geometric structure. The system can determine a second, or target, geometric structure that is structurally distinct from the first geometric structure. The system can determine a target geometric structure that is different beyond just size, scale or re-positioning of the wagering game object. For example, the system can determine a target geometric structure that is dissimilar in nature (e.g., subject matter, classification, etc.), visibly distinguishable as a distinct object in geometric structure, and/or discrete in nature from the form of the initial geometric structure. One example of a structurally distinct geometric structure may include morphing a wagering game object from a seed into a tree. In other words, a depiction of a seed looks structurally different from a depiction of a tree (e.g., is not just a smaller version of a tree) but has a different nature, or form (e.g., would typically be rendered utilizing different 3D models). The morphing changes the geometric structure of the seed (i.e., does more than make the seed grow into a larger seed, but changes its appearance to be that of an entirely new object). For instance, the system can present a picking game that presents three seeds. One of the seeds is a winning selection. If selected, the game can use degenerate polygons to morph the seed into a different object that has a different geometric structure, beyond just scale, but actually morphs structurally into a newly shaped object, such as a tree, a coin, a credit, etc. In another example, as shown in FIG. 4, the object morphing module 463 can determine that the initial geometric structure of the slot reel object 116 is currently apple shaped (i.e., determine the initial geometric structure 116A). Then, based on the action indicated in the mystery morphing rule 416, the object morphing module 463 can randomly select a target geometric structure of one slot reel element that is different from the current initial geometric structure 116A. For instance, the object morphing module 463 selects the shamrock shaped target geometric structure 116B, which has a geometric structure that is distinct from the initial geometric structure 116A, and that is not currently indicating a winning game result (i.e., is not in an active payline) for a given spin in the wagering game 110. In some embodiments, the object morphing module 463 can analyze the target geometric structure and compare it to the initial geometric structure to determine that a pre-determined number of the coordinates, or specific locations of coordinates, are different between the initial geometric structure and the target geometric structure. The difference in the coordinates can indicate, via the analysis, that the target geometric structure is geometrically different from the geometric structure of the initial geometric structure beyond physical scale or repositioning of the original structure. In other embodiments, the system can refer to a list of distinct reel playing elements provided by the wagering game 110 that are pre-determined to be distinct in nature or form.

In some embodiments, the system can determine a morphing algorithm that morphs the plurality of degenerate polygons assigned to the wagering game object. The system can dynamically morph the plurality of degenerate polygons into the target geometric structure according to the morphing algorithm. For example, in FIG. 4, the object morphing module 463 can select an apple-to-shamrock morphing algorithm 412 from a morphing algorithm store 465. The object morphing module 463 can use the apple-to-shamrock morphing algorithm 412 to morph the slot reel object 116 from the initial geometric structure 116A to the target geometric structure 116B, changing the slot reel object 116 from the apple shape to the shamrock shape.

Figure 5A:
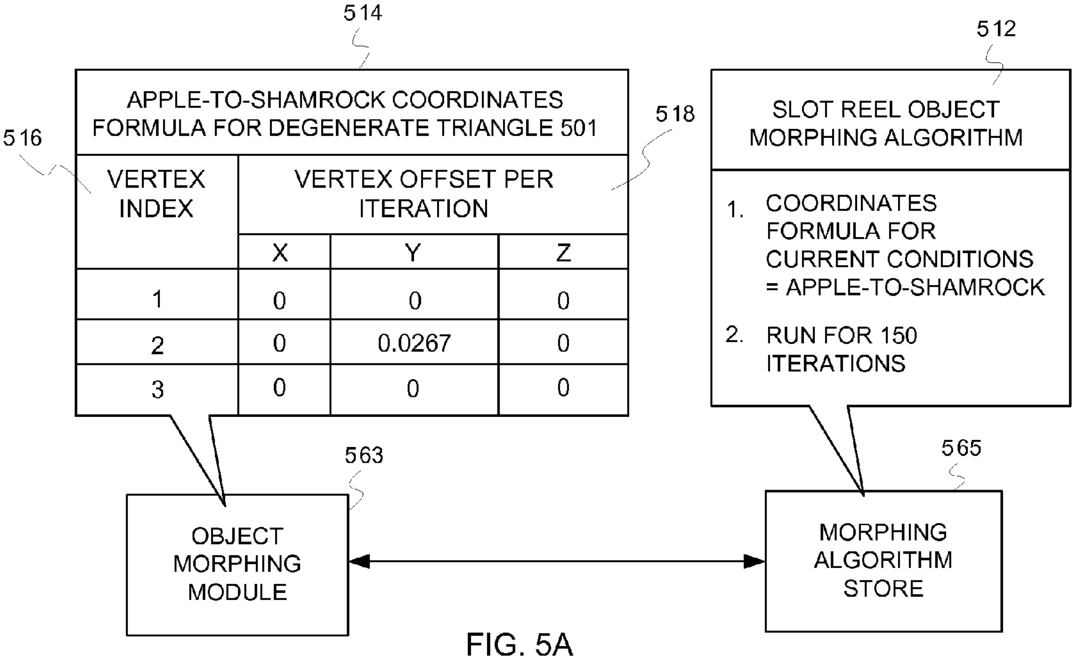
FIG. 5 is an illustration of morphing a wagering game object using morphing algorithm parameters based on wagering game conditions, according to some embodiments.
Figure 5B:
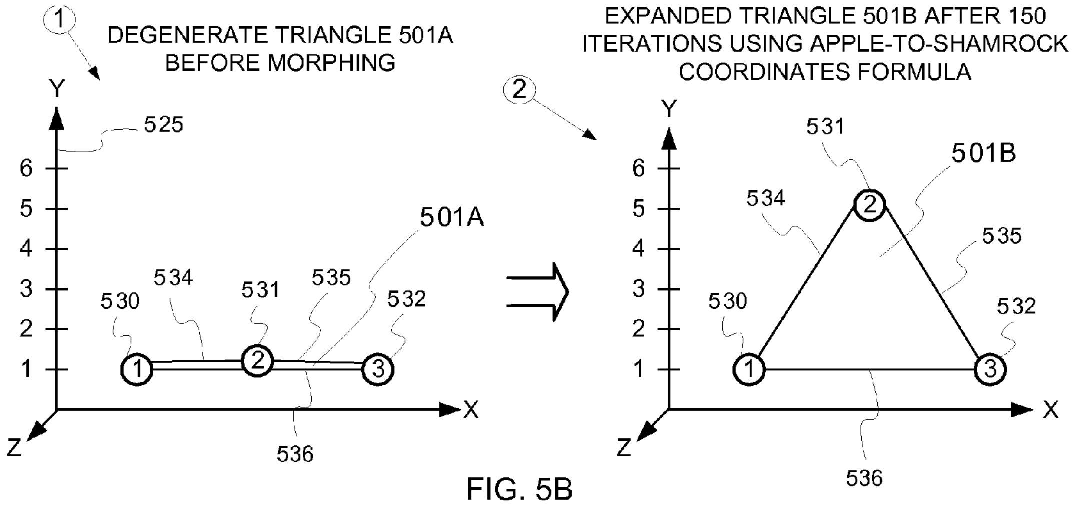
Figure 5C:
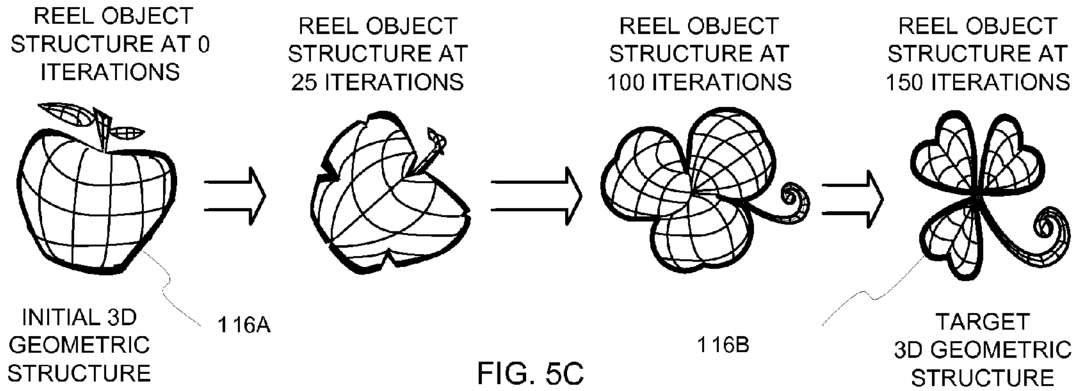

Returning to FIG. 3, in some embodiments, the system can determine and use parameters for a morphing algorithm based on the one or more wagering game conditions. FIGS. 5A, 5B, and 5C illustrate an example. In FIG. 5A, an object morphing module 563 accesses a morphing algorithm store 565 to obtain slot reel object morphing algorithm 512. The slot reel object morphing algorithm 512 may include instructions for morphing a slot reel object (e.g., slot reel object 116) into different target geometric structures. However, the specific target geometric structure may be passed into the slot reel object morphing algorithm 512 based on the one or more wagering game conditions. For instance, the slot reel object morphing algorithm 512 may utilize one of many different coordinate formulas as parameters. The coordinate formulas indicate, or define, the specific target geometric structure. For example, based on the one or more wagering game conditions, the object morphing module 563 may determine, and pass an apple-to-shamrock coordinate formula ("coordinate formula") 514 into the slot reel object morphing algorithm 512. For other conditions, however, the object morphing module 563 may utilize different coordinate formulas (e.g., an apple-to-strawberry coordinate formula). Thus, the object morphing module 563 can parameterize coordinate formulas based on the conditions. The coordinate formulas include instructions that morph the selected wagering game object into a specific form. In one example, the coordinate formula 514 can include a vertex index 516 of all degenerate polygonal vertices for the wagering game object, and a vertex coordinate offset 518 that defines movement values that the degenerate polygonal vertices must move per iteration to change a shape of an object's geometry from the initial geometric structure to the target geometric structure. The vertex index 516 only shows three degenerative polygon vertices, vertex "1," vertex "2," and vertex "3." The three vertices can correlate with vertices for a degenerate triangle 501A illustrated in FIG. 5B. Specifically, vertex "1" correlates with vertex 530, vertex "2" correlates with vertex 531, and vertex "3" correlates with vertex 532. However, though not shown, the coordinate formula 514 may include many more vertices related to many more degenerate triangles that make up a selected wagering game object (e.g., slot reel object 116). The coordinate formula 514 uses the vertex coordinate offset 518 to move the vertices 530, 531, and 532 on a coordinate grid 525 of a polygonal structural mesh. The vertex coordinate offset 518, therefore, can define an amount of movement, per iteration for the vertices 530, 531, and 532 to move from initial locations associated with an initial geometric structure to final locations associated with a target geometric structure.

The slot reel object morphing algorithm 512 may also indicate a number of iterations to move the vertices 530, 531, and 532 from the initial locations to the final locations. In some embodiments, the number of iterations may also be a parameter based on the one or more wagering game conditions. The object morphing module 563 can run the number of iterations of the slot reel object morphing algorithm 512 according to a coordinate formula 514, which causes vertices 530, 531, and 532 of the degenerate triangle 501A to move, as indicated FIG. 5B. In FIG. 5B, at stage "1," the degenerate triangle 501A is positioned on the coordinate grid 525. For simplicity, the coordinate grid 525 only shows coordinate values for a Y-axis component, however, it should be noted that the degenerate triangle 501A can be associated with coordinate values for three dimensions (e.g., X-axis, Y-axis, and Z-axis coordinates). At stage "1" the degenerate triangle has the vertex 530 at a "Y=1" coordinate location, the vertex 531 at a "Y=1" coordinate location, and the vertex 532 at a "Y=1" location, forming edges 534, 535, and 536, such that the three vertices 530, 531, and 532 are collinear along a line segment and the degenerate triangle 501A is not expanded. At stage "2," the object morphing module 563 can run a pre-specified number of iterations (e.g., one-hundred fifty iterations indicated in the slot reel object morphing algorithm 512). The object morphing module 563 moves the position of vertex 531 (i.e., vertex "2") by 0.0267 Y-coordinates per each of the one hundred and fifty iterations, resulting in a final position for the vertex 531 at a "Y=5" value (i.e., Y_target_coordinate_value=Y_initial_coordinate_value+(Y_offset_value×number_of_iterations)=1+(0.0267×150)=5). Consequently, the object morphing module 563 moves the vertex 531 from the "Y=1" value to the "Y=5" value over the course of the total iterations. During the movement of the vertex 531, the edges 534 and 535 can grow, or stretch, in size and position into a non-degenerate triangle 501B. The edge 536, however, did not grow, or stretch according to this embodiment. In some embodiments, any of the vertices 530, 531, and 532 of the degenerate triangle 501A may overlap before vertex movement. In some embodiments, the vertices 530, 531, and 532 can be coplanar on a single line segments. In some embodiments, the vertex coordinate offset 518 may include constant values, variable values, sinusoidal values, formula-based values, etc.

It should also be noted that the slot reel object morphing algorithm 512 may utilize multiple coordinate formulas. For example, the slot reel object morphing algorithm 512 may run a specified number of iterations (e.g., 15 iterations), change the coordinate formula 514 to a different set of instructions, run another specified number of iterations (e.g., 26 iterations), and so forth utilizing a number of different coordinate formulas up to the total value of iterations (or any other number of iterations needed to morph the gaming object). In some embodiments, a morphing algorithm (e.g., the slot reel object morphing 512) can run an unspecified number of iterations but stop when some other condition is met. As an example, a morphing algorithm may run a number of iterations necessary to morph a wagering game object from a shamrock shape to a balloon shape. The morphing algorithm can inflate the balloon in size, but can stop inflating the balloon when the balloon reaches a certain "stop" size. The "stop" size can be determined as result of a random number generator and can be relevant to an award or outcome (e.g., larger balloon equates with larger payout, a smaller balloon equates with a smaller payout, a popped balloon equates to no payout or a "pooper"). However, the morphing algorithm may not know the pre-specified size ahead of time until the random number generator has specified the outcome or award value. In some instances, the morphing algorithm can determine the number of iterations based on the required size of the balloon. In other instances, however, the morphing algorithm can begin to grow the size of the balloon without knowing the final number of iterations, but may receive a stop instruction to cease iterating when the random number generator determines the random award or outcome. In some embodiments, a morphing algorithm can morph objects without having to rewrite index buffers. Other embodiments, however, can rewrite index buffers.

FIG. 5C illustrates an example of the geometric structure of the slot reel object 116 at different iteration values. For example, at zero ("0") iterations, the slot reel object 116 possesses the initial geometric structure 116A. During the morphing of the slot reel object 116, the object morphing module 563 can generate the geometric structures shown to form edges, faces, polygons, surfaces, etc. of a polygonal mesh for the slot reel object 116 until reaching the target geometric structure 116B after one-hundred-fifty ("150") iterations. The object morphing module 563 can render object shapes at each of the iterations, or at specific numbers of iterations (depending on a desired degree of morphing fluidity displayed during the morphing), with skins, textures, shadows, etc.

Returning to FIG. 3, in some embodiments the system can render the wagering game object on a wagering game machine display. The system can render the wagering game object in stages. In other embodiments, however, the system can render only the end geometric structure. During rendering, the system can map vertex points onto a 3D coordinate system, form a polygonal mesh, and generate a texture or skin for the mesh (i.e., texture mapping). In some embodiments, the system utilizes a shader program in conjunction with graphics rendering hardware (e.g., a graphics card), to generate the polygonal mesh(s) during rendering. It should be noted that morphing a three-dimensional (3D) object using degenerate polygons is different from morph targeting using 3D models, which do not use degenerate triangles, but rather uses standard, or non-degenerate triangles. As stated previously, modifying shapes using 3D models, via morph targeting, requires storing multiple, pre-defined 3-D models of the 3D object's shape at different stages using the various pre-defined 3D models of the pre-set intermediate 3D stage shapes to change the 3D object's wireframe structure. However, the use of degenerate polygons to morph geometric structures or degenerate polygon morphing, according to some embodiments, can attain a 3D object's target geometric structure by expanding and/or collapsing degenerate polygons using object morphing algorithms, without having to store and use multiple pre-defined 3D models to generate a range of shapes. In addition, according o some embodiments, degenerate polygon morphing is not confined to morph degrees, but rather can use the object morphing algorithms to generate the morphing differences that reposition the degenerate polygon vertices.

The flow 300 continues at processing block 308, where the system generates a wagering game reward in accordance with the morphed wagering game object. For instance, a morphed wagering game object can result in a wagering game reward as described above in the description associated with FIG. 1.

Additional Example Embodiments

According to some embodiments, a wagering game system ("system") can provide various example devices, operations, etc., to morph geometric structures of wagering game objects. The following non-exhaustive list enumerates some possible embodiments.

- In some embodiments, the system can morph gaming objects based on player information. For example, the system can read player settings regarding preferred target geometric structures and morph initial geometric structures based on the player settings. In another example, the system can also provide controls or other features that permit a player to stretch or shape gaming objects. Further, in some embodiments, the system can change gaming object shapes in a wagering game based on a geographic location of a player. For example, a player could play a game on a mobile wagering game machine or the player can move to different wagering game machines in a casino. The player could receive a gaming object when the player is playing the game in a first room in a casino. The gaming object can be a key that unlocks functionality, a hidden reward, an inventory item, a player status symbol, or any other gaming object that provides or triggers a secondary activity or reward at a later time. When the player goes into another room of the casino, the gaming object can change into another shape or form and can provide or trigger the secondary activity or reward. The system can further morph the gaming object when the player goes into other locations, or revisits previous locations, of the casino. The system can provide configuration tools so that a casino can customize the gaming object based on the player's locations within the casino. The configuration tools can customize the object to take on customized casino settings and/or include casino branding.
- In some embodiments, the system can morph objects in secondary applications (e.g., secondary wagering games, episodic games, social communication applications, etc.) associated with a primary wagering game or associated with the one or more wagering game conditions. For example, the system can determine that a wagering game condition occurred in conjunction with a first wagering game, where the wagering game condition satisfies a morphing requirement. The system can then select a gaming object of a secondary application, and morph the gaming object. The gaming object can have a first geometric structure that includes degenerate polygons. The system can determine a second geometric structure for the gaming object, where the second geometric structure is structurally distinct from the first geometric structure. The system can then morph the degenerate polygons in the gaming object. The secondary application can be another wagering game that the player plays or that is associated with the player's account. In other embodiments, however, the system can morph gaming objects in other players' games or secondary applications based on activity that occurred in a first player's primary wagering game (e.g., morph gaming objects for additional player accounts that are listed as social contacts associated with a player account that plays the primary wagering game). Furthermore, the system can morph gaming objects that are in social networking applications, community game applications, etc, such as an avatar for a player account, a player trophy, etc. based on requirements that the player account met, or goals that the player account attained, during play in the primary wagering game.

In some embodiments, the system can distribute morphing algorithms, or data associated with morphing algorithms, over a network. For example, the system can push out morphing algorithms and parameters to wagering game machines over a network for new themes. In another example, a wagering game machine can pull morphing algorithms from a server. In another example, the system can access a wagering game web server that includes morphing algorithms that can morph a player's virtual trophy associated with a player account. For instance, the system can morph the virtual trophy from a silver cup to gold platter based on a game condition or event (e.g., a royal flush, a big win, etc.) or any other condition. Further, in some embodiments, the system can send only parameterized data and texture information over a network (e.g., send only coordinate formulas or coordinates programs). The algorithms can be pre-stored on the wagering game machines, but can receive the parameterized data and texture information to morph and render gaming objects.

In some embodiments, the system can change or control aspects of gaming objects other than geometric structure. For example, the system can change textures maps of a 3D wagering game object using degenerate triangles. In another example, the system can determine the directionality of light and sound (external to a wagering game machine) and emulate the effect that those external elements have on gaming objects within the gaming animation. The system can morph the objects based on the environmental, or physical, world effects. Further, in some embodiments, the system can control tessellation of a gaming object. The system can add triangle strips to compute lighting to generate smoother surfaces and/or to make a wagering game object appear 3D which before did not appear 3D. For example, the system can make an object appear to have a moving or animating geometric structure. In addition, in some embodiments, the system can predetermine collision information using degenerate polygon morphing algorithms, and then transmit the final collision information to a graphics card for the graphics card to render as a collision. For example, in some embodiments, such as with community wagering games, or wagering games that have object interactions, the system can run degenerate polygon algorithms to simulate collision geometry and to get all of the collision data without having to generate graphical imagery at that time. Once the algorithms have completed running, the system can generate the geometric structures to present the object collisions or send that data to other machines or to hardware devices on a wagering game machine to generate graphical imagery using the collision data. In some embodiments, the system can incorporate a bounding box into a degenerate polygon morphing algorithm and use the bounding box for collisions. When a bounding box collides with another bounding box, the system can utilize degenerate polygon algorithms to simulate the collision data. Thus, in some embodiments, the system can utilize degenerate polygons to morph gaming object shapes, to control collision data for gaming objects, or to control both morph shapes and collisions for gaming objects concurrently. The system can store vertex information, texture information, lighting information, and other information related to the structure of the object separate from collision data. Furthermore, in some embodiments, the system can change other gaming object properties based on the morphed state of the gaming object. For example, when the system 100 morphs the wagering game object 116 from an apple shape to a shamrock shape, the system 100 can apply new object properties or characteristics that comport with shamrock shaped objects according to programming for the wagering game 110.

Additional Example Operating Environments

This section describes example operating environments, systems and networks, and presents structural aspects of some embodiments.

Wagering Game Machine Architecture

Figure 6:
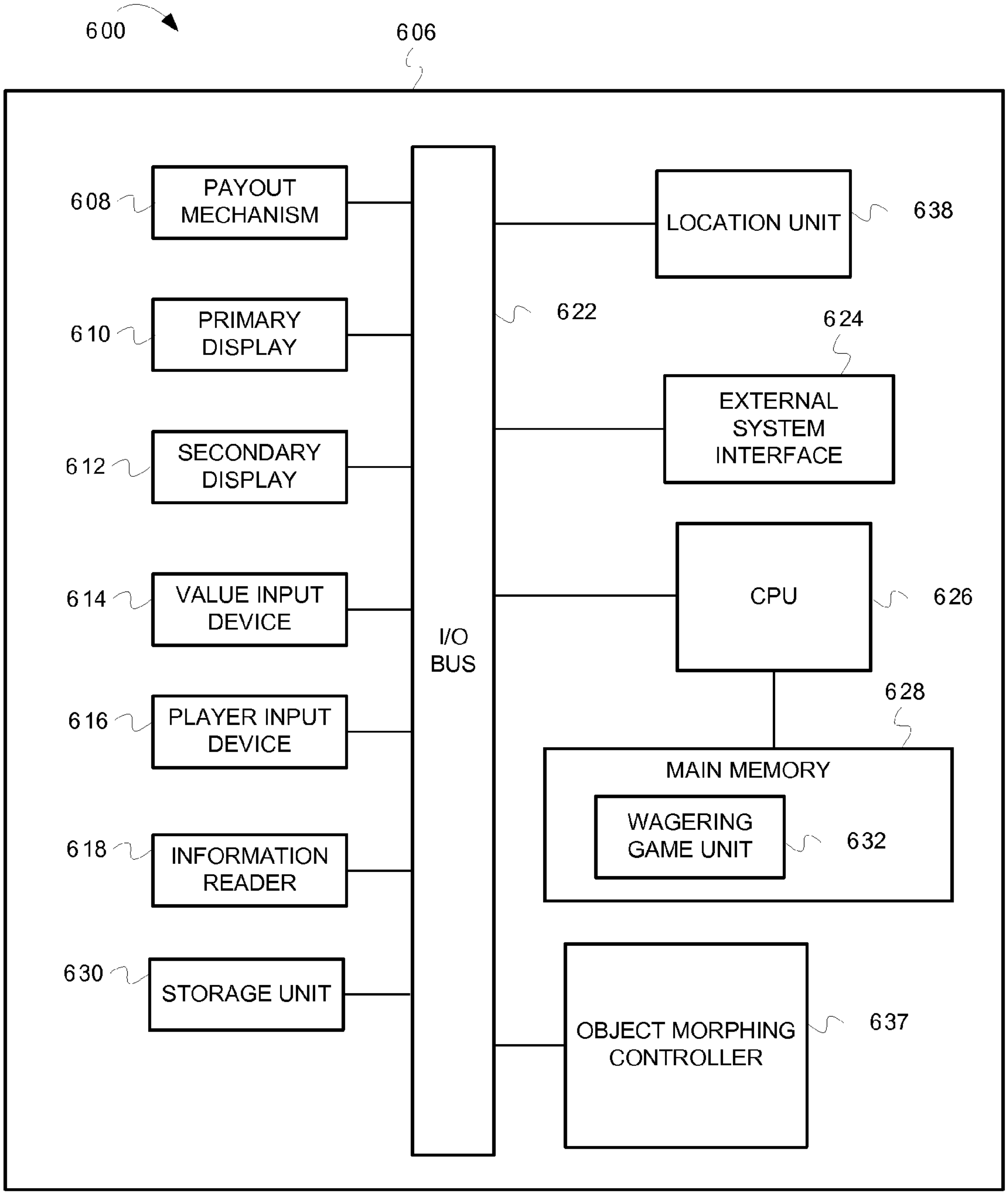
FIG. 6 is an illustration of a wagering game machine architecture 600, according to some embodiments.

FIG. 6 is a conceptual diagram that illustrates an example of a wagering game machine architecture 600, according to some embodiments. In FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In some embodiments, the wagering game unit 632 can present wagering games, such as video poker, video black jack, video slots, video lottery, reel slots, etc., in whole or part.

The CPU 626 is also connected to an input/output ("I/O") bus 622, which can include any suitable bus technologies, such as an AGTL+frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems (e.g., wagering game networks). The external system interface 624 can include logic for exchanging information over wired and wireless networks (e.g., 802.11g transceiver, Bluetooth transceiver, Ethernet transceiver, etc.)

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In some embodiments, the wagering game machine 606 can include additional peripheral devices and/or more than one of each component shown in FIG. 6. For example, in some embodiments, the wagering game machine 606 can include multiple external system interfaces 624 and/or multiple CPUs 626. In some embodiments, any of the components can be integrated or subdivided.

In some embodiments, the wagering game machine 606 includes an object morphing controller 637. The object morphing controller 637 can process communications, commands, or other information, where the processing can morph geometric structures of wagering game objects.

Furthermore, any component of the wagering game machine 606 can include hardware, firmware, and/or machine-readable storage media including instructions for performing the operations described herein.

Mobile Wagering Game Machine

Figure 7:
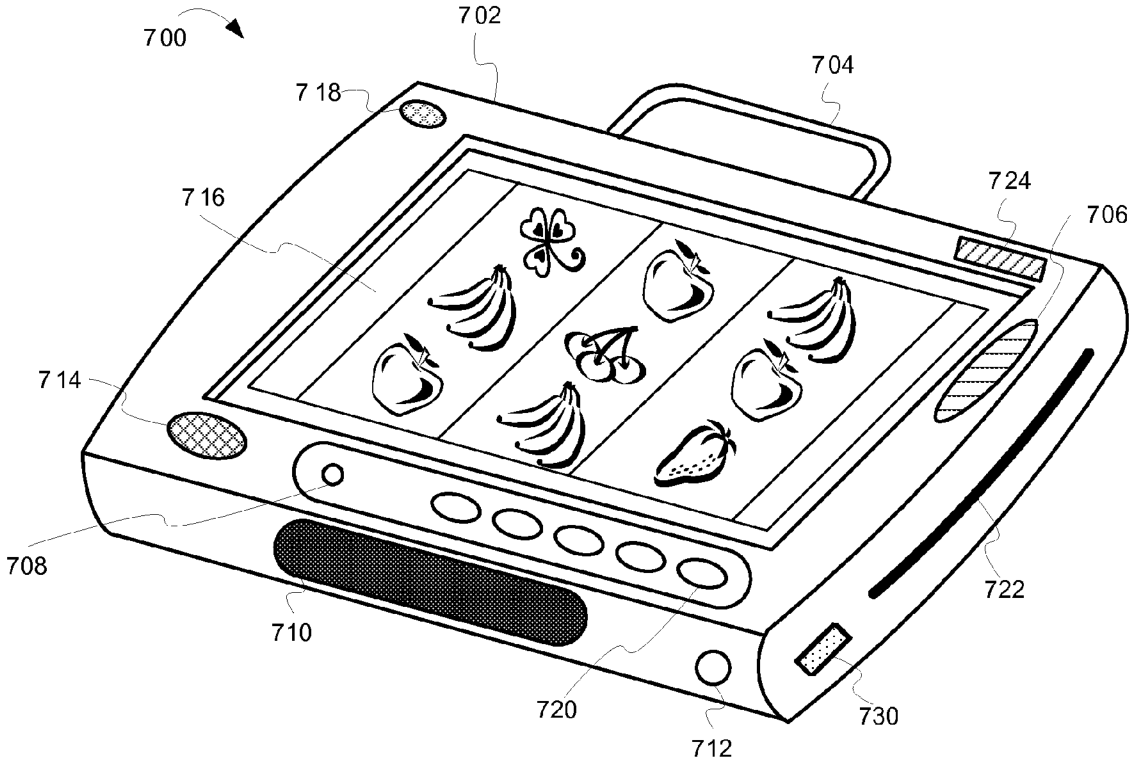
FIG. 7 is an illustration of a mobile wagering game machine 700, according to some embodiments.

FIG. 7 is a conceptual diagram that illustrates an example of a mobile wagering game machine 700, according to some embodiments. In FIG. 7, the mobile wagering game machine 700 includes a housing 702 for containing internal hardware and/or software such as that described above vis-à-vis FIG. 6. In some embodiments, the housing has a form factor similar to a tablet PC, while other embodiments have different form factors. For example, the mobile wagering game machine 700 can exhibit smaller form factors, similar to those associated with personal digital assistants. In some embodiments, a handle 704 is attached to the housing 702. Additionally, the housing can store a foldout stand 710, which can hold the mobile wagering game machine 700 upright or semi-upright on a table or other flat surface.

The mobile wagering game machine 700 includes several input/output devices. In particular, the mobile wagering game machine 700 includes buttons 720, audio jack 708, speaker 714, display 716, biometric device 706, wireless transmission devices (e.g., wireless communication units 712 and 724), microphone 718, and card reader 722. Additionally, the mobile wagering game machine can include tilt, orientation, ambient light, or other environmental sensors.

In some embodiments, the mobile wagering game machine 700 uses the biometric device 706 for authenticating players, whereas it uses the display 716 and the speaker 714 for presenting wagering game results and other information (e.g., credits, progressive jackpots, etc.). The mobile wagering game machine 700 can also present audio through the audio jack 708 or through a wireless link such as Bluetooth.

In some embodiments, the wireless communication unit 712 can include infrared wireless communications technology for receiving wagering game content while docked in a wager gaming station. The wireless communication unit 724 can include an 802.11G transceiver for connecting to and exchanging information with wireless access points. The wireless communication unit 724 can include a Bluetooth transceiver for exchanging information with other Bluetooth enabled devices.

In some embodiments, the mobile wagering game machine 700 is constructed from damage resistant materials, such as polymer plastics. Portions of the mobile wagering game machine 700 can be constructed from non-porous plastics, which exhibit antimicrobial qualities. Also, the mobile wagering game machine 700 can be liquid resistant for easy cleaning and sanitization.

In some embodiments, the mobile wagering game machine 700 can also include an input/output ("I/O") port 730 for connecting directly to another device, such as to a peripheral device, a secondary mobile machine, etc. Furthermore, any component of the mobile wagering game machine 700 can include hardware, firmware, and/or machine-readable storage media including instructions for performing the operations described herein.

Wagering Game Machine

Figure 8:
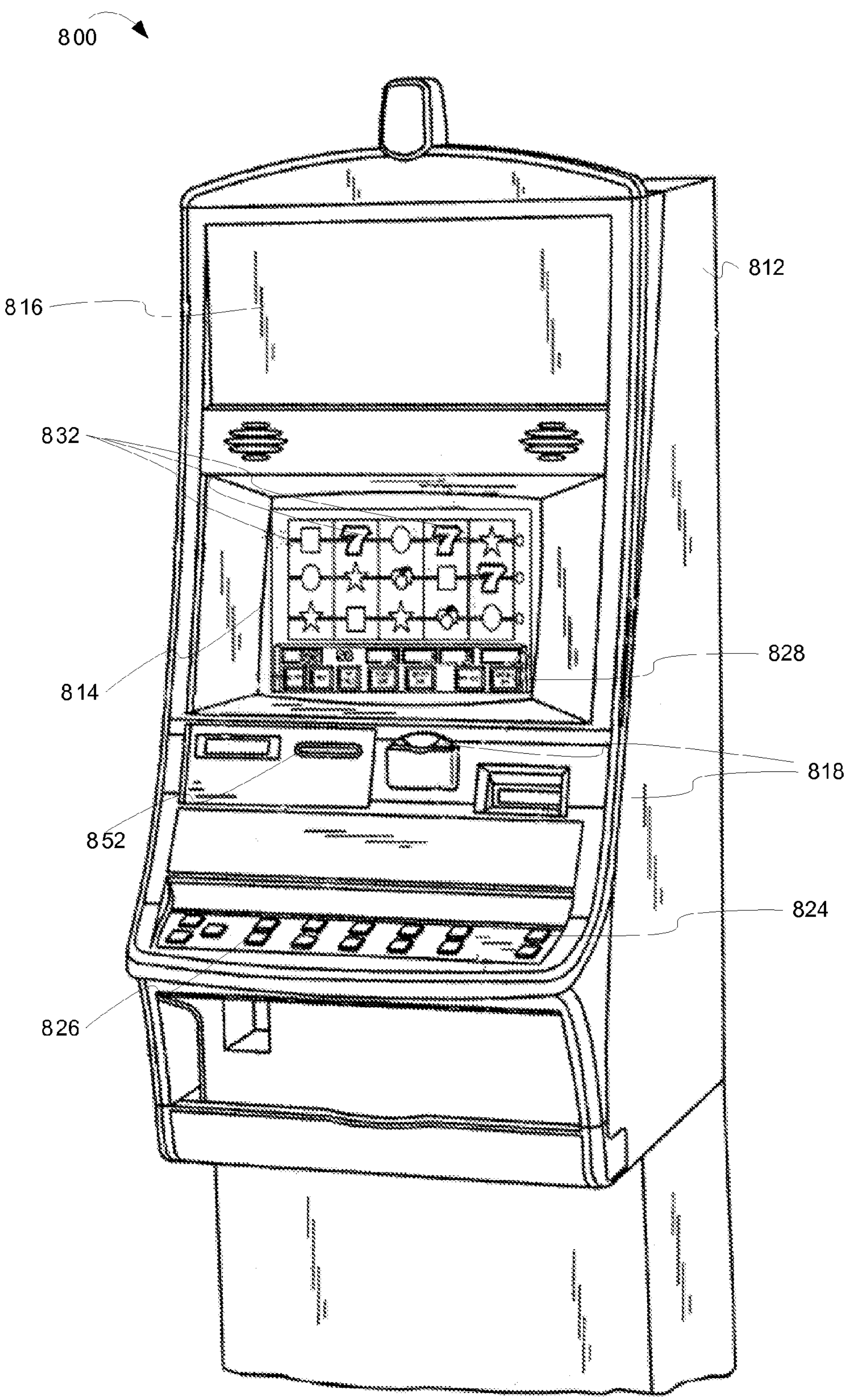
FIG. 8 is an illustration of a wagering game machine 800, according to some embodiments.

FIG. 8 is a conceptual diagram that illustrates an example of a wagering game machine 800, according to some embodiments. Referring to FIG. 8, the wagering game machine 800 can be used in gaming establishments, such as casinos. According to some embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bar top model, mobile handheld model, or workstation console model.

A player begins playing a basic wagering game by making a wager via the value input device 818. The player can initiate play by using the player input device's buttons or touch screen 828. The basic game can include arranging a plurality of symbols along a pay line 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, some embodiments may be embodied in a machine-readable signal medium including an electrical, optical, acoustical or other form of propagated signal (e.g., carrier waves, infrared signals, digital signals, etc.).

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system, said method comprising:

presenting, based on a random wagering game outcome, a set of symbols via a display of a wagering game machine, wherein the set of symbols are associated with a pay table for an electronic casino wagering game, wherein at least a portion of the set of symbols are not in a pay line, wherein the wagering game machine includes a value input device configured to receive a physical form of monetary value, and wherein the monetary value is for placement of wagers on the electronic casino wagering game;

randomly selecting, from the portion of the set of symbols that are not in the pay line, at least one symbol, wherein the at least one symbol includes a plurality of degenerate polygons which form a first three-dimensional geometric structure, and wherein the plurality of degenerate polygons are configured to have movable vertices;

determining, via one or more electronic processing units of the gaming system, a degree of wagering activity performed by a player account for the electronic casino wagering game before presentation of the random wagering game outcome;

morphing, via an electronic processing unit of the gaming system, the at least one symbol by a degree of morphing that corresponds to the degree of the wagering activity from the first three-dimensional geometric structure of the at least one symbol into a second three-dimensional geometric structure via movement of the movable vertices of the plurality of degenerate polygons, wherein the second three-dimensional geometric structure is structurally distinct from the first three-dimensional geometric structure; and determining whether the degree of the morphing of the at least one symbol causes at least a portion of the set of symbols to have a symbol configuration that equates to a winning outcome of the electronic casino wagering game.

2. The method of claim 1 further comprising:

determining a degree of playing history for a wagering game player that is logged on to the wagering game machine during a wagering game session in which a wagering game application is running;

selecting, based on the degree of the playing history, a degenerate polygon morphing algorithm that defines the second three-dimensional geometric structure; and morphing the first three-dimensional geometric structure of the at least one symbol, via the degenerate polygon morphing algorithm, to the second three-dimensional geometric structure, wherein the morphing comprises moving the movable vertices of the plurality of degenerate polygons from first locations associated with the first three-dimensional geometric structure until the movable vertices are in second locations associated with the second three-dimensional geometric structure.

3. The method of claim 1 further comprising:

determining a degree of wager amounts for the electronic casino wagering game, selecting an object morphing algorithm that controls morphing for the at least one symbol, determining morphing parameters based on the degree of the wager amounts, wherein the morphing parameters define the second three-dimensional geometric structure, passing the morphing parameters to the object morphing algorithm, and morphing the at least one symbol from the first three-dimensional geometric structure to the second three-dimensional geometric structure, via the morphing parameters in accordance with the object morphing algorithm.

4. The method of claim 1, wherein the second three-dimensional geometric structure is structurally distinct from the first three-dimensional geometric structure in more than size and scale.

5. The method of claim 1, wherein morphing the at least one symbol further comprises, determining a first set of coordinates at which the movable vertices for the plurality of degenerate polygons are positioned on a three-dimensional graphical mesh when the first three-dimensional geometric structure is created, determining a second set of coordinates for at least some of the movable vertices of the plurality of degenerate polygons, wherein the second set of coordinates is associated with the second three-dimensional geometric structure, and modifying locations of the at least some of the movable vertices on the three-dimensional graphical mesh from the first set of coordinates to the second set of coordinates.

6. The method of claim 1, further comprising:

determining a wagering game outcome in accordance with the second three-dimensional geometric structure, and providing an award, based on the wagering game outcome, to the player account associated with a wagering game session, wherein a degree of value for the award is based on the degree of the morphing.

7. One or more non-transitory, machine-readable storage media having instructions stored thereon, which when executed by a set of one or more processors of a gaming system cause the set of one or more processors to perform operations comprising:

presenting, based on a random wagering game outcome, a set of symbols via a display of a wagering game machine, wherein the set of symbols are associated with a pay table for an electronic casino wagering game, wherein at least a portion of the set of symbols are not in a pay line, and wherein the wagering game machine includes a value input device configured to receive a physical form of monetary value, wherein the monetary value is for placement of wagers on the electronic casino wagering game;

selecting from the portion of the set of symbols that are not in the pay line, at least one symbol that represents a game element of a wagering game, wherein the at least one symbol is controlled via an application running during a wagering game session on the wagering game machine, wherein the at least one symbol has a first three-dimensional geometric structure that includes a plurality of degenerate polygons, and wherein the plurality of degenerate polygons have vertices that are movable on a graphical polygonal mesh;

determining, via a global-positioning receiver, a degree of change to a geographic location of one or more of a wagering game player associated with the wagering game machine and the wagering game machine;

determining, based on the degree of the change to the geographic location, a second three-dimensional geometric structure for the at least one symbol, wherein the second three-dimensional geometric structure is structurally distinct from the first three-dimensional geometric structure;

morphing the at least one symbol by a degree of morphing that corresponds to the degree of the change to the geographic location from the first three-dimensional geometric structure to the second three-dimensional geometric structure, via movement of the vertices of the plurality of degenerate polygons, to appear structurally distinct from the first three-dimensional geometric structure, wherein the morphing moves the vertices from overlapping positions on the graphical polygonal mesh to non-overlapping positions on the graphical polygonal mesh; and determining whether the degree of the morphing of the at least one symbol causes at least a portion of the set of symbols to have a symbol configuration that equates to a winning outcome of the electronic casino wagering game.

8. The one or more non-transitory, machine-readable storage media of claim 7, said operations further comprising:

determining activation of the application during the wagering game session;

assigning the plurality of degenerate polygons to the at least one symbol; and constructing the first three-dimensional geometric structure using the plurality of degenerate polygons.

9. The one or more non-transitory, machine-readable storage media of claim 7, wherein the change to the geographic location triggers one or more of a new wagering game function, a hidden reward, an inventory item, or a player status symbol represented by the second three-dimensional geometric structure.

10. The one or more non-transitory, machine-readable storage media of claim 7, wherein said operation for morphing the at least one symbol, includes operations further comprising:

for the at least one symbol, determining a degenerate polygon morphing algorithm that morphs the vertices of the plurality of degenerate polygons assigned to the first three-dimensional geometric structure, and dynamically moving the vertices of the plurality of degenerate polygons, according to the degenerate polygon morphing algorithm, until the first three-dimensional geometric structure has attained an appearance of the second three-dimensional geometric structure.

11. The one or more non-transitory, machine-readable storage media of claim 10, wherein the degenerate polygon morphing algorithm includes a coordinate formula with a vertex index of the vertices for the at least one symbol, and a coordinate offset that defines movement values that the vertices must move per iteration of the degenerate polygon morphing algorithm to change a shape for the at least one symbol, and wherein the operation for dynamically moving the vertices of the plurality of degenerate polygons includes operations further comprising:

for the at least one symbol, determining a number of iterations to iterate the degenerate polygon morphing algorithm to move the vertices, and iterating the degenerate polygon morphing algorithm for the number of iterations.

12. A gaming system comprising:

a processor; and a memory storage device configured to store instructions, which when executed by the processor cause the gaming system to perform operations to, randomly select at least one symbol from a portion of a set of symbols that are not in a pay line for an electronic casino wagering game, wherein the set of symbols are associated with a pay table for the electronic casino wagering game, determine a degree of gaming activity associated with one or more of the electronic casino wagering game or a plurality of wagering game machines, determine, based on the degree of the gaming activity, a morphing action indicated in a morphing rule associated with a game outcome that occurs on a wagering game network for the electronic casino wagering game, wherein the game outcome occurs via a wagering game application configured to run on the plurality of wagering game machines in a casino, wherein the plurality of wagering game machines include value input devices configured to receive a physical form of monetary value, and wherein the monetary value is for placement of wagers on the electronic casino wagering game associated with the wagering game application, determine, based on the morphing action, a target three-dimensional geometric structure for a three-dimensional graphical object, wherein the target three-dimensional geometric structure is structurally distinct from an initial three-dimensional geometric structure for the at least one symbol, and wherein the at least one symbol represents a playing element in the wagering game application, select an object morphing algorithm that can morph degenerate polygons associated with the at least one symbol from the initial three-dimensional geometric structure to the target three-dimensional geometric structure, wherein the degenerate polygons have vertices that are movable on a graphical polygonal mesh, morph the degenerate polygons associated with the at least one symbol by a degree of morphing that corresponds to the degree of the gaming activity, via movement of the vertices of the degenerate polygons from overlapping positions on the graphical polygonal mesh to non-overlapping positions on the graphical polygonal mesh, according to the object morphing algorithm, and determine whether the degree of the morphing of the at least one symbol causes at least a portion of the set of symbols to have a symbol configuration that equates to a winning outcome of the electronic casino wagering game.

13. The gaming system of claim 12, further comprising a morphing algorithm store configured to, store the object morphing algorithm on the wagering game network, and periodically provide the object morphing algorithm via the wagering game network.

14. The gaming system of claim 12, wherein the memory storage device is configured to store instructions, which when executed by the processor cause the gaming system to perform operations to, select a coordinate formula associated with the object morphing algorithm, wherein the coordinate formula indicates an amount of movement for the vertices per iteration of the coordinate formula, determine a first set of coordinates that define the initial three-dimensional geometric structure, determine a number of iterations of the coordinate formula required to move the vertices from the first set of coordinates to a second set of coordinates that define the target three-dimensional geometric structure, and iterate the coordinate formula the number of iterations.

15. The gaming system of claim 12, wherein the memory storage device is configured to store instructions, which when executed by the processor cause the gaming system to perform operations to provide a wagering game reward based on the target three-dimensional geometric structure, wherein a value for the wagering game reward depends on a size to which the at least one symbol is morphed.

16. A gaming apparatus, comprising:

a processor; and an object morphing controller configured to, via the processor, present, based on a random wagering game outcome, a set of symbols via a display of a wagering game machine, wherein the set of symbols are associated with a pay table for an electronic casino wagering game, wherein at least a portion of the set of symbols are not in a pay line, wherein the wagering game machine includes a value input device configured to receive a physical form of monetary value, and wherein the monetary value is for placement of wagers on the electronic casino wagering game, randomly select, from the portion of the set of symbols that are not in the pay line, at least one symbol, wherein the at least one symbol includes a plurality of degenerate polygons which form a first three-dimensional geometric structure, and wherein the plurality of degenerate polygons are configured to have movable vertices, determine that a number of wagers, performed via the wagering game machine, triggers a morphing action of the at least one symbol, wherein the at least one symbol represents one of a plurality of displayed playing elements of the electronic casino wagering game, select a degenerate polygon morphing algorithm, based on the number of wagers, wherein the degenerate polygon morphing algorithm is capable of repositioning degenerate triangle vertices of the at least one symbol from the first three-dimensional geometric structure to a second three-dimensional geometric structure that is structurally distinct from the first three-dimensional geometric structure, wherein the degenerate triangle vertices are movable, morph the at least one symbol into the second three-dimensional geometric structure by a degree of morphing that corresponds to the number of wagers, via the repositioning of the degenerate triangle vertices, according to the degenerate polygon morphing algorithm, and determine whether the degree of the morphing of the at least one symbol causes at least a portion of the set of symbols to have a symbol configuration that equates to a winning outcome of the electronic casino wagering game.

17. The gaming apparatus of claim 16, wherein the object morphing controller is further configured to determine that the at least one symbol is in a subset of the plurality of displayed playing elements that does not display a winning result for the electronic casino wagering game, and randomly select the at least one symbol from the subset of the plurality of displayed playing elements.

18. The gaming apparatus of claim 16, wherein the object morphing controller is further configured to modify object properties of the at least one symbol to comport with the second three-dimensional geometric structure.

19. The gaming apparatus of claim 16, wherein the object morphing controller is further configured to control collisions for the at least one symbol using the degenerate polygon morphing algorithm.

20. The method of claim 1, wherein the degree of the morphing includes a plurality of morph degrees that correspond to a plurality of shape states for the second three-dimensional geometric structure, wherein the plurality of shape states correspond to a plurality of payout values for the winning outcome.

21. The method of claim 1, wherein the morphing the at least one symbol by the degree of the morphing further comprising:

determining a random number of iterations to iterate a degenerate polygon morphing algorithm that corresponds, at least in part, to the degree of the wagering activity, wherein each iteration causes one or more of the vertices of the plurality of degenerate polygons from the at least one symbol to move a specific distance, and wherein at least a portion of the random number of iterations cause the at least one symbol to change in size; and iterating the degenerate polygon morphing algorithm for the random number of iterations.

22. The method of claim 21 further comprising:

after the at least one symbol is iterated the random number of iterations, determining that the at least one symbol is a part of the portion of the set of symbols that has the symbol configuration that equates to the winning outcome, and determining a level of payout to provide based on a size of at least one symbol.

23. The method of claim 1, wherein the wagering game machine includes a value output device configured to provide a payout for the winning outcome as the physical form of monetary value.

24. The one or more non-transitory, machine-readable storage media of claim 11, wherein the operation of determining the number of iterations comprises selecting the number of the iterations to correspond to the degree of the wagering activity, wherein at least some of the iterations cause the at least one symbol to grow in size, and said operations further comprising after the at least one symbol is iterated according to the number of iterations, determining a level of the payout to provide based on a size of the at least one symbol.

25. The one or more non-transitory, machine-readable storage media of claim 7, said operations further comprising morphing the at least one symbol to simulate collusion data for the at least one symbol.

26. The gaming system of claim 12, wherein the memory storage device is configured to store instructions, which when executed by the processor cause the gaming system to morph the at least one symbol without using three-dimensional modeling.

27. The gaming system of claim 12, wherein the memory storage device is configured to store instructions, which when executed by the processor cause the gaming system to:

determine, based on a position tracking device of one or more of the plurality of wagering game machines, a geographic change to a location of presentation of the wagering game application; and morph the at least one symbol in response to the geographic change to the location of the presentation of the wagering game application.

28. The gaming system of claim 12, wherein the memory storage device is configured to store instructions, which when executed by the processor cause the gaming system to:

determine, in response to the game outcome, a social network relationship between a first player account associated with a first of the plurality of wagering game machines and a second player account associated with a second of the plurality of wagering game machines, wherein the game outcome is associated with the first of the plurality of wagering game machines; and select, based on the social network relationship, the second of the plurality of wagering game machines on which to morph the at least one symbol.

* * * * *